March 12, 1935.  W. H. McKISSICK  1,994,024
SHEAVE BLOCK
Filed Nov. 15, 1934
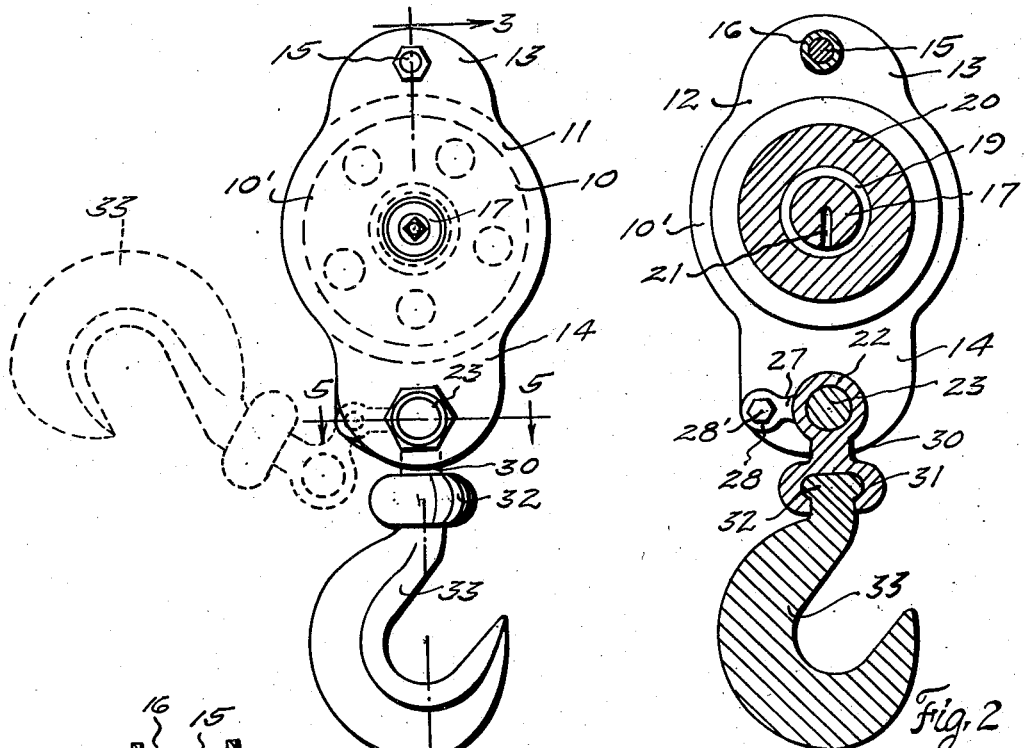
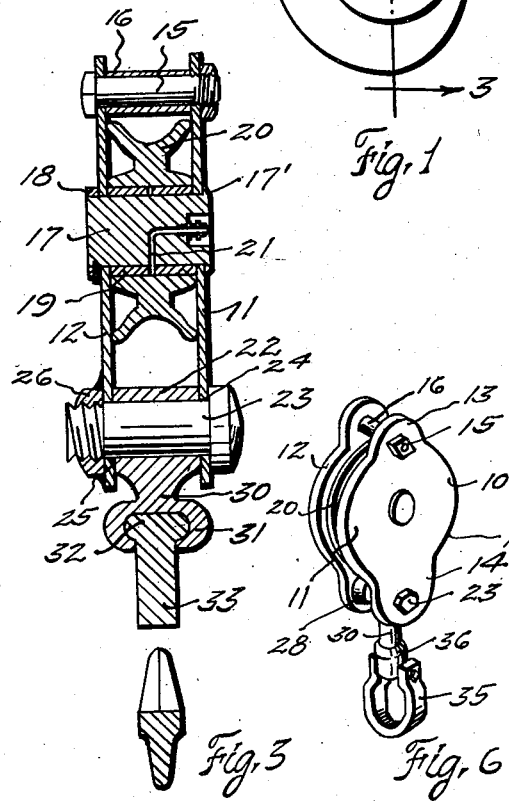
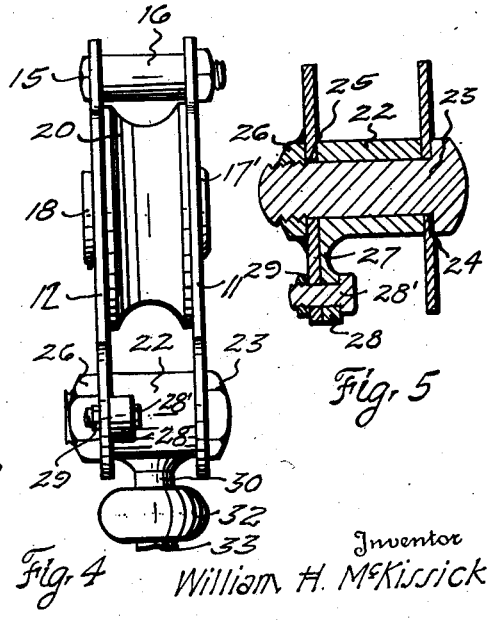
Inventor
William H. McKissick
By Jack Ashley
Attorney Patented Mar. 12, 1935

1,994,024

UNITED STATES PATENT OFFICE 1,994,024

SHEAVE BLOCK

William H. McKissick, Tulsa, Okla.

Application November 15, 1934, Serial No. 753,084

6 Claims. (Cl. 254—193)

This invention relates to new and useful improvements in sheave blocks.

One object of the invention is to provide an improved sheave block having a hook mounted at its lower end arranged so as to be swung out of the way to permit inserting of a cable in said block.

Another object of the invention is to provide an improved hook arranged at the lower end of the block so as to be swung laterally out of alignment with the vertical axis of the block on which it is mounted and without completely disconnecting it from said block.

Still another object of the invention is to provide a hook or supporting member at the lower end of a sheave block normally mounted to swing on a removable bolt and provided with an auxiliary support, whereby when the bolt is removed the hook may be swung to one side while still remaining attached to the block.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a side elevation of a sheave block constructed in accordance with the invention and showing the improved hook in dotted lines, swung to its open position, Figure 2 is a vertical sectional view of the same, Figure 3 is a transverse vertical sectional view, taken on the line 3—3 of Figure 1, Figure 4 is an end elevation, Figure 5 is a horizontal, cross-sectional view, taken on the line 5—5 of Figure 1, and Figure 6 is an isometric view of a block, having a clevis mounted at its lower end in place of the hook.

In the drawing, the numeral 10 designates a sheave block comprising a pair of vertical side plates 11 and 12. Each plate includes an intermediate portion 10', circular in shape, and is formed with an upwardly extending extension 13 and a lower extension 14 depending therefrom. Although the plates are shown and described as of this particular shape, it is pointed out that they may be of any desired size or shape.

The plates 11 and 12 form the sides of the block and are connected at their upper ends by a tie bolt 15. The bolt passes through each plate and also through a spacer sleeve 16 which spaces the plates a desired distance from each other. An axle 17 extends transversely through the centers of the circular portions 10' of the plates 11 and 12 and has a head 17' on one end engaging the outer side of the plate 11. The other end of the axle has a retaining ring 18 fastened thereon, whereby the axle is firmly, yet demountably, secured in the block 10. A bronze bushing 19 surrounding the axle is confined between the plates, and a sheave 20 is mounted to rotate on said bushing. The axle and bushing may, if desired, be provided with the usual lubricating duct 21 (Fig. 3).

At the lower end of the block 10 between the extensions 14 of the plates 11 and 12, a becket 22 is mounted on a transverse becket bolt 23. The bolt passes through apertures 24 and 25 in the plates 11 and 12 and has its outer end screw-threaded into a nut 26 which is preferably welded to the outer face of the extension 14 of the plate 12. It is obvious that with this arrangement, the bolt 23 is readily removable while the nut is made a part of the plate 12 and can not be lost or displaced. Further, in inserting the bolt, less time is necessary for the nut is always in alignment therewith.

The becket 22 is provided with a horizontally extending arm 27 at one end thereof and preferably made integral therewith. With the becket in position on the bolt 23, this arm lies contiguous to the inner face of the extension 14 on the plate 12. An eye 28 is formed on the outer end of said arm and a bolt 28' passes through this eye and through the plate 12 and receives a nut 29 on its outer end.

The becket 22 is provided with a central depending shank 30 having a circular head 31 on its lower end. The head is engaged by an annular boss 32 on the upper end of a hook 33. By observing Figure 3, it will be seen that the connection between the hook and shank is such that the hook may swivel.

Normally the parts are as shown in full lines in Figures 1 and 2. The hook depends from the block 10, so as to support a load substantially in alignment with the vertical arms thereof. When it is desired to move the hook and becket out of alignment with the vertical axis of the block so as to permit the insertion or removal of a cable (not shown) on the sheave 20, it is only necessary to remove the bolt 23. The hook and becket may then be swung laterally to the position shown in dotted lines in Figure 1, the pivot point being at the bolt 28'. Thus, it will be seen that to move the hook and becket completely out of the way, it is not necessary to entirely remove said hook and becket but only to swing the same after removing the bolt 23.

It is obvious that the mounting of the becket not only provides a substantial support for said hook but also permits a great saving of time in inserting or removing cable from the sheave. Also the pivoting of the arm 27 to its block assures a convenient support for the becket and hook as well as preventing entirely separation of the becket and block. The arm guides the becket so that when it is swung back to its closed position its bore will register with the apertures 24 and 25, thus making insertion of the becket bolt 23 more easy.

In Figure 6, I have shown another form of the invention wherein a clevis 35 is substituted for the hook. The mounting is exactly the same except that the clevis is provided with a head 36 for engaging a boss on the shank 30, to form a swivel connection between the clevis and shank.

What I claim and desire to secure by Letters Patent is:

1. The combination with a sheave block, of a hook, means for supporting said hook at the lower end of the block adapted to be removed, and auxiliary supporting means for the hook when the first supporting means is removed, said auxiliary supporting means being carried by the block and arranged to support the hook at one side of the block to facilitate inserting of the cable.

2. The combination with a sheave block, of a becket, a bolt supporting said becket at the lower end of the block, a hook carried by the becket, and an auxiliary support at one side of the block for supporting the becket when the bolt is removed.

3. The combination with a sheave block, of a becket, a bolt supporting said becket at the lower end of the block, a hook secured to the lower end of the becket and arranged to swivel, and auxiliary supporting means for the becket when the bolt is removed, said auxiliary means being carried by the block and arranged to support the hook at one side of the block to facilitate inserting of the cable.

4. The combination with a sheave block, of a becket, a bolt supporting said becket at the lower end of the block, a hook carried by the becket, and auxiliary supporting means carried by the block and attached to said becket for swinging the same and the hook carried thereby out of alinement with the vertical axis of the block when the bolt is removed.

5. The combination with a sheave block, of a becket, a bolt supporting said becket at the lower end of the block, a hook carried by the becket, and a pin at one side of the block having the becket pivoted thereon for supporting the becket when the bolt is removed.

6. The combination with a sheave block, of a becket, a bolt supporting said becket at the lower end of the block, a hook carried by the becket, the becket having a laterally extending arm which has its outer end pivotally mounted to the block, whereby the becket and hook may be swung laterally when the bolt is removed.

WILLIAM H. McKISSICK.